United States Patent
Bry et al.

(10) Patent No.: US 10,436,523 B2
(45) Date of Patent: Oct. 8, 2019

(54) THERMAL BATTERY WITH ENCAPSULATED PHASE-CHANGE MATERIAL AND ASSOCIATED PRODUCTION METHOD

(71) Applicant: Valeo Systemes Thermiques, Le Mesnil Saint-Denis (FR)

(72) Inventors: Samuel Bry, Laval (FR); Patrick Boisselle, Laval (FR); Kamel Azzouz, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 147 days.

(21) Appl. No.: 15/546,076

(22) PCT Filed: Jan. 26, 2016

(86) PCT No.: PCT/EP2016/051595
§ 371 (c)(1),
(2) Date: Jul. 25, 2017

(87) PCT Pub. No.: WO2016/120282
PCT Pub. Date: Aug. 4, 2016

(65) Prior Publication Data
US 2018/0017339 A1    Jan. 18, 2018

(30) Foreign Application Priority Data

Jan. 26, 2015  (FR) ..................................... 15 50580

(51) Int. Cl.
*F28D 20/02* (2006.01)
*F28F 9/013* (2006.01)
*F28D 20/00* (2006.01)

(52) U.S. Cl.
CPC ......... *F28D 20/023* (2013.01); *F28D 20/021* (2013.01); *F28F 9/0135* (2013.01); *F28D 2020/0017* (2013.01); *Y02E 60/145* (2013.01)

(58) Field of Classification Search
CPC ................. F28D 20/023; F28D 20/021; F28D 2020/0017; F28D 2020/0021; F28D 20/00; F28F 9/0135; Y02E 60/145; Y02E 60/14
(Continued)

(56) References Cited

U.S. PATENT DOCUMENTS 4,294,078 A   10/1981  MacCracken
5,239,839 A *  8/1993  James ..................... F25D 3/005
                                                      126/400
(Continued)

FOREIGN PATENT DOCUMENTS

DE    43 22 899 C1    7/1994
DE    4322899 C1  *  7/1994  ......... B60H 1/00492
(Continued)

OTHER PUBLICATIONS

International Search Report issued in PCT/EP2016/051595 dated Apr. 5, 2016 (3 pages).
(Continued)

*Primary Examiner* — Justin M Jonaitis
(74) *Attorney, Agent, or Firm* — Osha Liang LLP

(57) ABSTRACT

The present invention relates to a thermal battery (1) comprising an enclosure (3) comprising a fluid inlet and outlet and comprising within it tubes (5) of encapsulated phase-change material, said thermal battery (1) further comprising a device (7) for holding and spacing the tubes (5) of encapsulated phase-change material, said holding and spacing device (7) being arranged between the tubes (5) themselves
(Continued)

Figure 1:
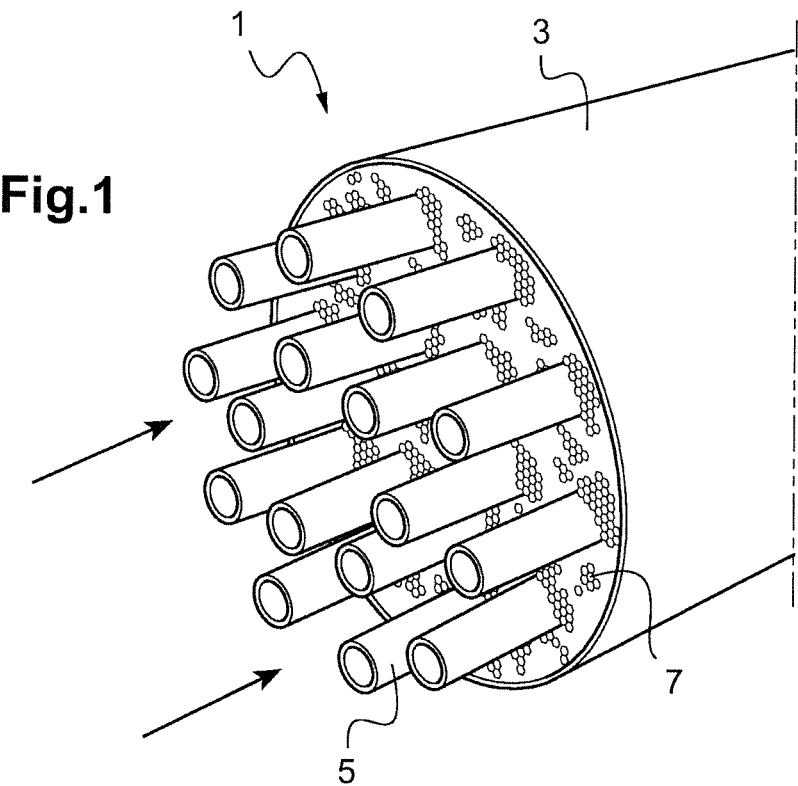

selves and between the tubes (5) and the enclosure (3), said holding and spacing device (7) being porous.

19 Claims, 1 Drawing Sheet

(58) Field of Classification Search
USPC .................. 165/60, 104.17, 10, 902, 236
See application file for complete search history.

(56) References Cited

U.S. PATENT DOCUMENTS

| | | | | |
|---|---|---|---|---|
| 2009/0294094 A1* | 12/2009 | Suzuki | ................. | F28D 20/023 165/10 |
| 2010/0276121 A1* | 11/2010 | Sagie | ................... | F28D 7/1607 165/110 |
| 2011/0289924 A1* | 12/2011 | Pietsch | .............. | F28D 20/0056 60/682 |
| 2012/0037148 A1* | 2/2012 | Tudor | .................... | F28D 20/02 126/400 |
| 2012/0085518 A1* | 4/2012 | Ichkahn | .............. | F28D 15/0275 165/104.26 |
| 2014/0138042 A1* | 5/2014 | Yagi | .......................... | B60L 1/02 165/10 |
| 2014/0284020 A1* | 9/2014 | Amir | ....................... | F28D 15/02 165/10 |
| 2015/0241135 A1* | 8/2015 | Jove Llovera | ........ | F28F 9/0275 165/10 |
| 2017/0219294 A1* | 8/2017 | Longis | ................. | F24H 7/0216 |

FOREIGN PATENT DOCUMENTS

| | | |
|---|---|---|
| FR | 2 664 035 A1 | 1/1992 |
| WO | 2004/040222 A1 | 5/2004 |

OTHER PUBLICATIONS

Written Opinion of the International Searching Authority issued in PCT/EP2016/051595 dated Apr. 5, 2016 (4 pages).

* cited by examiner

THERMAL BATTERY WITH ENCAPSULATED PHASE-CHANGE MATERIAL AND ASSOCIATED PRODUCTION METHOD

The present invention relates to the field of thermal batteries and more specifically of thermal batteries comprising a phase-change material.

Thermal batteries are generally used for heating the vehicle interior, notably in electric and hybrid vehicles or for preheating a heat-transfer fluid in a thermal management circuit. Thermal batteries may also be used for preheating the engine oil or the automatic transmission fluid of vehicles with an internal combustion engine.

A thermal battery with phase-change material generally comprises an enclosure forming a reservoir inside which the phase-change material is placed, generally in encapsulated form. The performance of the thermal battery is thus dependent on the quantity of phase-change material that it is able to contain, coupled with the need for the fluid to circulate within the reservoir with the lowest possible pressure drops.

One of the objects of the present invention is therefore to at least partially overcome the disadvantages of the prior art and to propose an improved thermal battery.

The present invention therefore relates to a thermal battery comprising an enclosure comprising a fluid inlet and outlet and comprising within it tubes of encapsulated phase-change material, said tubes being arranged parallel to the flow of circulating fluid, said thermal battery further comprising a device for holding and spacing the tubes of encapsulated phase-change material, said holding and spacing device being arranged between the tubes themselves and between the tubes and the enclosure, said holding and spacing device being porous.

The fact that the holding and spacing device is porous and that it is arranged between the tubes themselves and between the tubes and the enclosure allows said tubes to be held optimally within the enclosure and also allows fluid to circulate through the thermal battery with limited pressure drops.

According to one aspect of the invention, the holding and spacing device comprises at least one rigid grid, the tubes passing through the meshes of said grid.

According to another aspect of the invention, the holding and spacing device comprises at least two grids and that said grids are held a distance apart by means fixing or immobilizing said grids against the enclosure.

According to another aspect of the invention, the holding and spacing device comprises at least two grids and that said grids are held a distance apart by means of spacers.

According to another aspect of the invention, the holding and spacing device comprises a foam placed within the enclosure and surrounding the tubes.

According to another aspect of the invention, the foam has a porosity of between 50 to 95%.

The present invention also relates to a method of producing a thermal battery comprising tubes of encapsulated phase-change material, said method comprising a step of positioning the tubes of encapsulated phase-change material within a porous holding and spacing device.

According to one aspect of the method according to the invention, the step of positioning the tubes consists in inserting said tubes into the meshes of at least one rigid grid.

According to another aspect of the method according to the invention, the step of inserting the tubes into the meshes of at least one rigid grid is preceded by a step of positioning the at least one rigid grid within the enclosure of the thermal battery.

According to one aspect of the method according to the invention, the step of inserting the tubes into the meshes of at least one rigid grid is performed outside the enclosure and that the method comprises an additional step of positioning the assembly formed by said tubes and the at least one rigid grid within the enclosure of the thermal battery.

According to one aspect of the method according to the invention, the step of positioning the tubes consists in positioning said tubes in a foam.

According to one aspect of the method according to the invention, the step of positioning the tubes in a foam comprises a first step of installing foam within the enclosure of the thermal battery and a second step of inserting the tubes into said foam.

According to one aspect of the method according to the invention, the step of positioning the tubes in a foam comprises a first step of installing the tubes within the enclosure of the thermal battery and a second step of installing foam within the enclosure in such a way as to surround said tubes.

Figure 2:
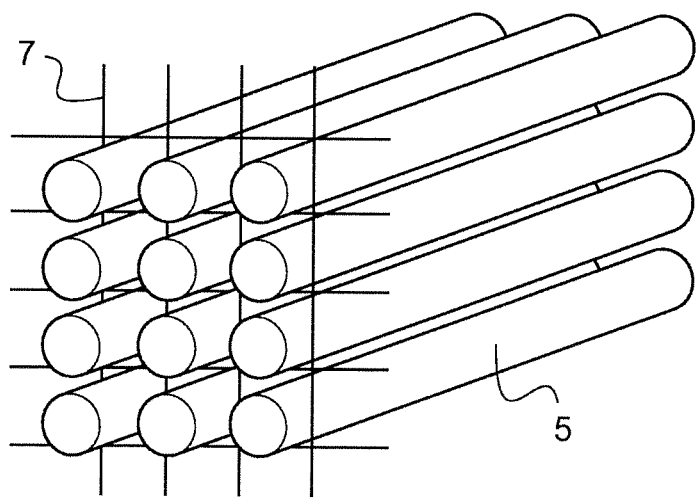

Further features and advantages of the invention will become more clearly apparent from reading the following description, given by way of nonlimiting illustration, and from the appended drawings, in which:

FIG. 1 depicts a schematic perspective view of a cross section through a thermal battery according to a first embodiment, FIG. 2 depicts a schematic perspective view of the internal elements of a thermal battery according to a second embodiment.

In the various figures, identical elements bear the same reference numbers.

FIG. 1 is a schematic depiction in cross section of a thermal battery 1 comprising an enclosure 3 comprising a fluid inlet and a fluid outlet (which are not depicted). The enclosure 3 comprises within it tubes 5 of encapsulated phase-change material. The tubes 5 are preferably arranged parallel to the circulating flow of fluid (which is indicated by arrows).

The thermal battery 1 further comprises a device 7 for holding and spacing the tubes 5 of encapsulated phase-change material. The holding and spacing device 7 is positioned between the tubes 5 themselves and between the tubes 5 and the enclosure 3. In order to allow the fluid to circulate through the thermal battery 1, the holding and spacing device 7 is porous.

The fact that the holding and spacing device 7 is porous and that it is arranged between the tubes 5 themselves and between the tubes 5 and the enclosure 3 allows said tubes 5 to be held optimally within the enclosure 3 and also allows fluid to circulate through the thermal battery 1 with limited pressure drops.

According to a first embodiment depicted in FIG. 1, the holding and spacing device 7 comprises a foam placed within the enclosure and surrounding the tubes 5. This is an expanded foam of low-density polyurethane, polyethylene or metallic type with open cells so as to allow the fluid to circulate. In order to have a circulation of fluid through the thermal battery with the least possible pressure drops, the porosity of the foam is preferably between 50 and 95%.

The foam preferably completely fills the enclosure 3 so as to ensure firm holding of the tubes 5.

According to a second embodiment illustrated in FIG. 2, the holding and spacing device 7 comprises at least one rigid grid, the tubes 5 then passing through the meshes of said rigid grid in order to be held.

In order to hold the tubes 5, the holding and spacing device 7 comprises at least two grids, each positioned at one end of said tubes 5. These grids are held a distance apart by means of fixing or immobilizing said grids against the enclosure 3. These means are, for example, adhesive bonding, brazing or else the presence of stops on the internal wall of the enclosure 3 so that the grids are not moved as the fluid circulates within the thermal battery.

These grids may also be held a distance apart by means of spacers placed between them.

The present invention also relates to the method of producing the thermal battery 1 comprising tubes 5 of encapsulated phase-change material. This method therefore comprises a step of positioning the tubes 5 of encapsulated phase-change material within a porous holding and spacing device 7.

According to the first embodiment described hereinabove, this step of positioning the tubes 5 within the porous holding and spacing device 7 consists in positioning said tubes 5 in a foam.

The step of positioning the tubes 5 in the foam may comprise a first step of installing foam within the enclosure 3 of the thermal battery 1 and a second step of inserting the tubes (5) into said foam.

Alternatively, the step of positioning the tubes 5 in the foam comprises a first step of installing the tubes 5 within the enclosure of the thermal battery and a second step of installing foam within the enclosure 3 in such a way as to surround said tubes 5.

In both scenarios, installing the foam within the enclosure 3 may be achieved by the injection and expansion of said foam directly into/in the enclosure 3, or alternatively by introducing a preformed foam into the enclosure 3.

According to the second embodiment described hereinabove, the step of positioning the tubes 5 within the porous holding and spacing device 7 consists in inserting said tubes 5 in the meshes of at least one rigid grid.

This step of inserting the tubes 5 into the meshes of at least one rigid grid may be preceded by a step of positioning the at least one rigid grid within the enclosure 3 of the thermal battery 1. The tubes 5 are then inserted into the meshes of at least one grid inside the enclosure 3.

Alternatively, the step of inserting the tubes 5 into the meshes of at least one rigid grid is performed outside the enclosure 3. The method then comprises an additional step of positioning the assembly formed by said tubes 5 and the at least one rigid grid into the enclosure 3 of the thermal battery 1.

The use of such a porous holding and spacing device 7 allows the production method a high degree of adaptability. Specifically, it is easy to modify the number of tubes 5 or the spacing thereof within the thermal battery 1 without needing to modify the method steps in order to do so. In order to modify the number of tubes 5 or the spacing thereof all that is then required is for the mesh size of the grids to be increased or decreased or alternatively for the preforming of the foam to be modified, when this foam is preformed. Where the foam is injected directly around the tubes 5, modifying the number of tubes 5 or the spacing thereof does not even have any impact.

Thus, it may be clearly seen that the thermal battery 1 according to the invention and its method of production allow the tubes 5 of phase-change material to be held firmly and also allow great adaptability in the production method.

The invention claimed is:

1. A thermal battery through which a fluid with a flow travels, comprising:
   an enclosure comprising a fluid inlet and a fluid outlet, the enclosure comprising cylindrical tubes of encapsulated phase-change material within the enclosure; and
   a holding and spacing device for holding and spacing the tubes of encapsulated phase-change material, said holding and spacing device being arranged between the tubes themselves and between the tubes and the enclosure, said holding and spacing device being porous,
   wherein the tubes are parallel to the flow of the fluid from the fluid inlet to the fluid outlet, wherein the fluid circulates around the tubes, through the holding and spacing device, and wherein the holding and spacing device holds the tubes optimally within the enclosure, minimizing pressure drops experienced by the fluid across the thermal battery.

2. The thermal battery as claimed in claim 1, wherein the holding and spacing device comprises at least one rigid grid, the tubes passing through meshes of said rigid grid.

3. The thermal battery as claimed in claim 2, wherein the holding and spacing device comprises at least two rigid grids and that said at least two rigid grids are held a distance apart by fixing or immobilizing said two rigid grids against the enclosure.

4. The thermal battery as claimed in claim 2, wherein the holding and spacing device comprises at least two rigid grids and said at least two rigid grids are held a distance apart by means of spacers.

5. The thermal battery as claimed in claim 1, wherein the holding and spacing device comprises a foam placed within the enclosure and surrounding the tubes.

6. The thermal battery as claimed in claim 5, wherein the foam has a porosity of between 50 to 95%.

7. The thermal battery as claimed in claim 5, wherein the foam is of metallic type.

8. The thermal battery as claimed in claim 5, wherein the foam comprises at least one of: low-density polyurethane and polyethylene.

9. The thermal battery as claimed in claim 5, wherein the foam encompasses an entirety of an interior volume of the enclosure that is not occupied by the tubes, the at least one rigid grid, and the spacers.

10. The thermal battery as claimed in claim 1, wherein the holding and spacing device encompasses an entirety of an interior volume of the enclosure that is not occupied by the tubes.

11. A method of producing a thermal battery comprising an enclosure having a fluid inlet and a fluid outlet and cylindrical tubes of encapsulated phase-change material where a fluid with a flow travels from the fluid inlet to the fluid outlet, said method comprising:
    inserting the tubes of encapsulated phase-change material into the porous holding and spacing device such that the tubes are parallel to the flow of the fluid,
    wherein the holding and spacing device holds the tubes so the fluid circulates around the tubes, through the holding and spacing device, and
    wherein the porous holding and spacing device holds the tulles optimally within the enclosure, minimizing pressure drops experienced by the fluid across the thermal battery.

12. The production method as claimed in claim 11, wherein inserting the tubes consists of inserting the tubes into meshes of at least one rigid grid.

13. The production method as claimed in claim 12, wherein inserting the tubes into the meshes of the at least one rigid grid is preceded by positioning the at least one rigid grid within the enclosure of the thermal battery.

14. The production method as claimed in claim 12, wherein inserting the tubes into the meshes of the at least one rigid grid is performed outside the enclosure and wherein the method further comprises positioning an assembly formed by said tubes and the at least one rigid grid within the enclosure of the thermal battery.

15. The production method as claimed in claim 11, wherein the tubes are inserted into a foam.

16. The production method as claimed in claim 15, wherein inserting the tubes in a foam comprises: a first step of installing foam within the enclosure of the thermal battery and a second step of inserting the tubes into said foam.

17. The production method as claimed in claim 16, wherein the first step of installing foam within the enclosure comprises completely filling an interior volume of the enclosure with foam.

18. The production method as claimed in claim 15, wherein inserting the tubes in a foam comprises: a first step of installing the tubes within the enclosure of the thermal battery, and a second step of installing foam within the enclosure so that the foam surrounds said tubes.

19. The production method as claimed in claim 18, wherein the foam is installed within the enclosure such that the foam encompasses an entirety of an interior volume of the enclosure that is not occupied by the tubes, the one or more rigid grid, and the spacers.

* * * * *